United States Patent  
Romaszko et al.

(10) Patent No.: US 11,342,867 B2
(45) Date of Patent: May 24, 2022

(54) METHOD FOR DETERMINING A MOVEMENT OF A ROTOR

(71) Applicant: APTIV TECHNOLOGIES LIMITED, St. Michael (BB)

(72) Inventors: Mateusz Romaszko, Cracow (PL); Grzegorz Wyszynski, Cracow (PL); Piotr Maj, Wegrzce Wielkie (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 40 days.

(21) Appl. No.: 16/839,162

(22) Filed: Apr. 3, 2020

(65) Prior Publication Data
US 2020/0328700 A1 Oct. 15, 2020

(30) Foreign Application Priority Data

Apr. 12, 2019 (EP) ..................... 19168930

(51) Int. Cl.
*H02P 7/28* (2016.01)
*H02P 6/00* (2016.01)
*H02P 6/28* (2016.01)
*H02P 6/24* (2006.01)

(52) U.S. Cl.
CPC ............... *H02P 6/007* (2013.01); *H02P 6/24* (2013.01); *H02P 6/28* (2016.02)

(58) Field of Classification Search
CPC .......... H02P 7/2805; H02P 6/007; H02P 6/28; H02P 6/24
See application file for complete search history.

(56) References Cited

U.S. PATENT DOCUMENTS

2009/0254300 A1* 10/2009 Schneider ............. H02P 7/2805
702/145

FOREIGN PATENT DOCUMENTS

JP 5728950 B2 * 6/2015
JP 5728950 B2 6/2015

OTHER PUBLICATIONS

Extended European Search Report for Application No. EP 19 16 8930 dated Sep. 26, 2016.

* cited by examiner

*Primary Examiner* — Cortez M Cook
(74) *Attorney, Agent, or Firm* — Carlson, Gaskey & Olds, P.C.

(57) ABSTRACT

A method for determining a movement of a rotor of an electric motor, comprises supplying a drive signal to a drive coil of the electric motor, sensing a coil current of the drive coil, detecting current ripples of the sensed coil current caused by the rotor of the electric motor crossing ripple generating positions, inferring the movement of the rotor from the detected ripples, braking the motor by reducing the drive signal supplied to the drive coil from an initial signal value to zero according to a braking curve specifying a non-zero fall time during which the drive signal is reduced from the initial signal value to zero. The braking curve is adapted so that the rotor does not cross a ripple generating position after the drive signal has been reduced to zero.

14 Claims, 15 Drawing Sheets

METHOD FOR DETERMINING A MOVEMENT OF A ROTOR

CROSS REFERENCE TO RELATED APPLICATION

Figure 1:
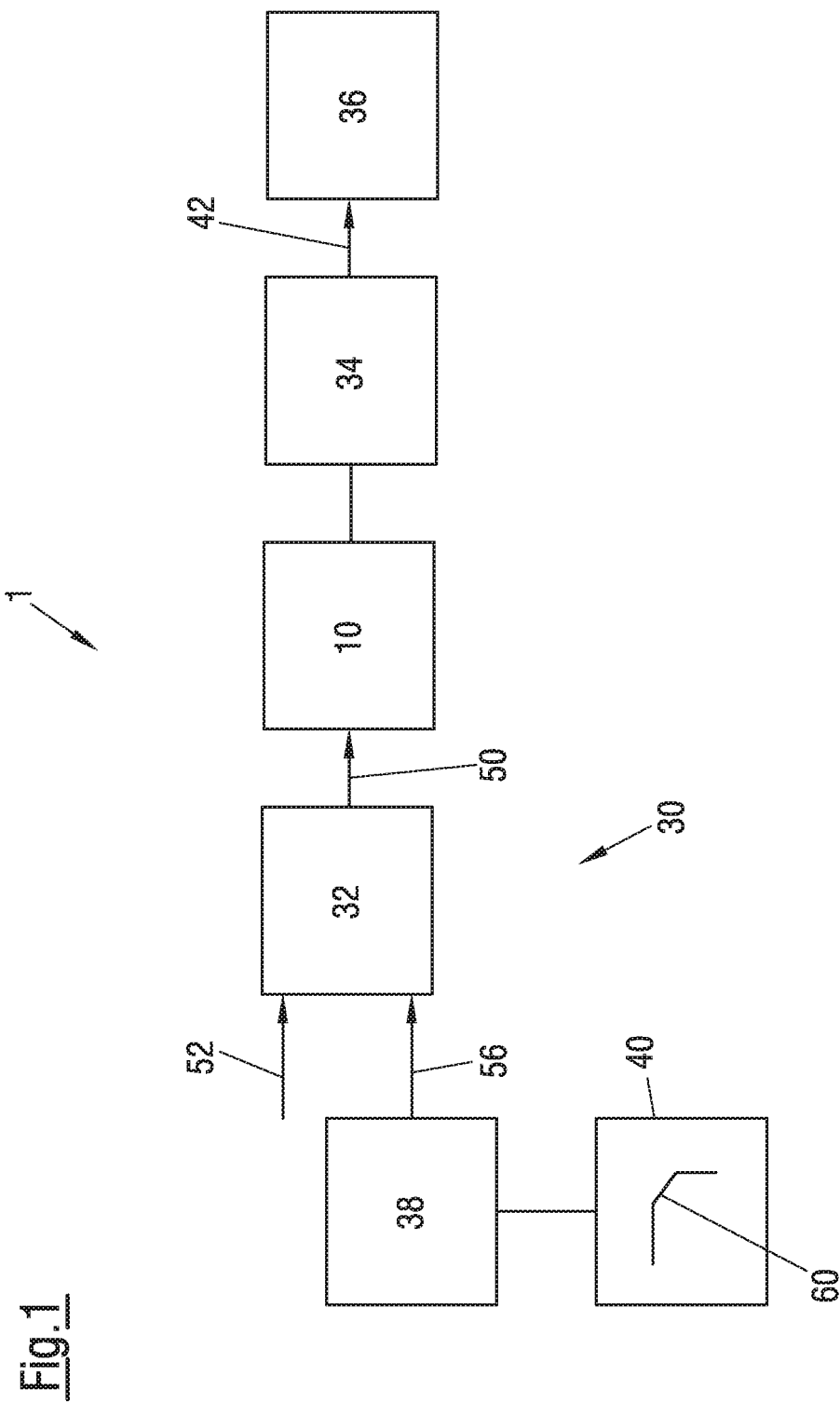

This application claims priority to European Patent Application No. 19168930.6, filed on Apr. 12, 2019.

FIELD

The present disclosure relates to a method for determining a movement of a rotor of an electric motor, a control system for an electric motor and a vehicle with an electric actuating drive comprising an electric motor.

BACKGROUND

Electric actuating drives with electric motors are used in automotive applications to drive power windows, sunroofs, passenger seats, tail gates or the like. In low power and medium power applications, these electric motors are usually configured as direct current motors that are supplied with a direct current drive signal and comprise a commutator to convert the drive signal into an alternating drive signal with a phase and frequency that is matched to the position and speed of the electric motor. The alternating drive signal is fed to electromagnetic drive coils of the electric motor that constitute the armature of the electric motor and interact with a static magnetic field provided by an excitation structure of the motor, for example, by excitation windings or permanent magnets. The armature may be positioned at the rotor or at the stator of the electric motor.

In automotive applications, it is often required to detect the movement of the motor and to infer, for example, the exact position and speed of the rotor. The movement of the motor may be detected by dedicated sensors, such as Hall sensors. Alternatively, the movement of the motor may be inferred from current fluctuations of the drive signal, so called current ripples that are caused by the moving rotor of the motor. These current ripples result, for example, from a commutator of the electric motor switching the phase of the drive signal or they may be induced when the magnetic field of the excitation structure that interacts with the drive coils changes while the rotor is moving.

If the electric motor is configured as a brushed direct current (BDC) motor, its commutator comprises brushes which carry the drive signal to commutation surfaces which in turn power the drive coils that create the magnetic field to produce the torque on the rotor of the electric motor. The commutator is linked to the rotor and as the rotor rotates the brushes come into contact with different sets of commutation surfaces. The majority of the time each brush touches two commutation surfaces however during every transition it touches only one commutation surface for a brief instant. During this transition the current path changes and the internal resistance and inductance of the electric motor change. This in turn alters the load represented by the motor and the current drawn by the motor. Repetitive commutation then causes current ripples that are superimposed to the drive current. The number of ripples per one full revolution of the rotor corresponds to the number of poles of the electric motor.

The position and speed of the rotor may be determined by detecting and counting the current ripples of the coil current. In order to obtain an accurate position of the rotor, every ripple that is caused by the movement of the rotor should be detected and false positive counts that are caused by ripples that are not linked to the movement of the rotor should be avoided.

Accordingly, there is a need to reliably detect current ripples of the drive current of an electric motor that are associated with the movement of the rotor of the electric motor.

SUMMARY

In one aspect, the present disclosure is directed at a method for determining a movement of a rotor of an electric motor, the method comprising: supplying a drive signal to a drive coil of the electric motor, sensing a coil current of the drive coil, detecting current ripples of the sensed coil current caused by the rotor of the electric motor crossing ripple generating positions, inferring the movement of the rotor from the detected ripples, braking the motor by reducing the drive signal supplied to the drive coil from an initial signal value to zero according to a braking curve specifying a non-zero fall time during which the drive signal is reduced from the initial signal value to zero, wherein the braking curve is adapted so that the rotor does not cross a ripple generating position after the drive signal has been reduced to zero.

By reducing the drive signal according to a braking curve that specifies a nonzero fall time and by adapting the braking curve so that the rotor does not cross a ripple generating position after the drive signal has been reduced to zero, all additional currents that might overlay the current ripples during braking are kept below a level above which they would prevent the current ripples from being detected. These additional currents are, for example, induced currents that are induced by a current change in the drive coils during reduction of the drive signal or currents that are generated by the rotation of the electric motor when it runs down to zero velocity after reducing or switching off the drive signal. Both the induced currents and the currents generated by the electric motor during run down superimpose the current ripples used to detect the movement of the rotor and thus increase the possibility that individual ripples are missed during detection or that additional detection events occur due to additional fluctuations of the additional, superimposed currents.

The electric motor may be a direct current electric motor, especially a commutated direct current electric motor such as a commutated brushed direct current (BDC) electric motor. The drive signal may be a unipolar drive signal and the commutated electric motor may comprise a commutator that is linked to the electric motor and converts the unipolar drive signal into at least two phase shifted alternating electric signals. The drive signal may be a pulse width modulated electric signal generated by a current source or a voltage source connected to the drive coil.

The current ripples of the sensed coil current that are used to infer the movement of the rotor may be caused by the commutator changing phases and the ripple generating positions of the electric motor may be commutation positions in which the commutator switches phases. The current ripples may also be fluctuations that are induced by temporal variations of the magnet field that is generated by the excitation structure of the electric motor in the drive coil. Such an excitation structure may be, for example, an excitation winding if the electric motor is a separately excited electric motor or a permanent magnet if the electric motor is a permanently excited motor.

The current ripples may be detected by checking whether a modulation of the drive current reaches a predetermined value. The predetermined value may be an extremum such as a maximum or a minimum or a zero crossing of the modulated part of the drive current. The current ripples may be separated from the continuous part of the sensed coil current by high pass filtering the sensed coil current.

Each current ripple may trigger a counter upon detection. The movement of the rotor may be inferred from the number of counted ripples, which yields the position of the rotor, and the frequency of the ripples or time intervals between individual ripples, which yield the velocity of the rotor.

The drive signal supplied to the drive coil may be controlled via open loop control so that the drive signal directly follows the braking curve. The drive signal may also be controlled via closed loop control so that it is reduced in a way that an additional controlled variable, for example the coil current flowing through the drive coil, follows the braking curve. The drive signal may, for example, be a pulse width modulated signal. When controlling the drive signal via closed loop control, the actuating variable used may, for example, be a duty cycle of the drive signal. The drive signal supplied to the drive coil may be generated by a supply module that is controlled via a control signal, e. g. a pulse width modulated control signal, and that comprises a transistor circuit that is switched by the control signal.

By adapting the braking curve so that the rotor does not cross a ripple generating position after the drive signal has been reduced to zero, it can be avoided that the rotor crosses of the ripple generating position at a time when the coil current is entirely determined by the additional uncontrolled currents generated during rundown of the motor. This increases the accuracy of the determination of the movement of the electric motor since the currents generated during rundown usually exhibit uncontrolled fluctuations that may overlap the ripples actually used to detect the movement of the rotor.

In order to avoid the rotor crossing a ripple generating position after reducing the drive signal to zero, the braking curve may be adapted by having a negative slope and/or a fall time that do not exceed predetermined thresholds beyond which an additional crossing of the ripple generating position may occur. The method described herein therefore may comprise additional steps for determining the negative slope and/or the fall time of the braking curve for a particular electric motor. The braking curve may feature sections with constant negative slope and may have discontinuities between individual sections with constant negative slope. For example, the braking curve may have a single section with constant negative slope that starts at the initial signal value and extends to zero or, alternatively, to a final non-zero signal value and subsequently abruptly drops to zero.

The negative slope and/or the fall time of the braking curve may be determined experimentally by varying the negative slope and/or the fall time of the braking curve and by monitoring the movement of the rotor of the particular motor after reduction of the drive signal to zero. All negative slope values and/or fall time values at which the rotor crosses a ripple generating position after the drive signal has been reduced to zero may be discarded. The negative slope of the braking curve and/or the fall time may then be chosen from the remaining values. The slope and fall time of the braking curve may be chosen as a combination of the remaining values of negative slope and fall time that overall exhibits the shortest fall time. In this regard, it has to be taken into account that the braking curve may comprise discontinuities so that the negative slope and fall time may vary independently from each other.

The braking curve, especially its negative slope and/or fall time, may be determined for a particular electric motor and may be stored in a memory unit of a control system performing the method. It is also possible to determine individual braking curves for a plurality of electric motors and to store all determined braking curves in the memory unit. The braking curve used during braking of a specific electric motor may then be chosen from the stored braking curves based on the electric motor actually connected to the controller. The control system may, for example, comprise a programming interface to receive a selection command that specifies the electric motor that is connected to the controller.

The braking curve may be stored in the memory of the control system as a sequence of samples of individual values of the braking curves that are spaced by a fixed sampling interval. The drive signal may be reduced stepwise with a predetermined temporal spacing. The temporal spacing may correspond to the sampling interval of the samples of the braking curve that are stored in the memory unit. Additionally, or alternatively, the temporal spacing may equal a sampling interval of a detection algorithm employed to detect the current ripples of the drive current. This minimizes the influence that the discrete reduction of the drive signal has on the detection of the current ripples.

According to an embodiment, the braking curve is adapted so that the coil current does not reverse before the drive signal has reached zero. Analogous to the uncontrolled currents flowing in the drive coil after reducing the drive signal to zero, a reversal of the coil current may also obscure the current ripples used to determine the movement of the rotor or it may induce additional spurious fluctuations that cause false detection events. The braking curve may be adapted, for example, by experimentally determining a negative slope and a fall time of the braking curve that, on the one hand, prevents the drive signal from reversing and, on the other hand, exhibits the shortest overall fall time.

According to an embodiment, the braking curve causes a linear decrease of the drive signal between the initial signal value and a final signal value. This allows for an easy control of the drive signal during the braking time, especially when implementing open-loop control of the drive signal. The slope of the linearly decreasing braking curve may be adapted to prevent the rotor of the electric motor crossing a ripple generating position and/or to prevent the coil current changing sign before the drive signal has reached zero.

According to an embodiment, the final signal value amounts to zero. This allows for continuously reducing the drive signal down to zero and for avoiding a sudden and discontinuous drop of the drive signal which would disturb the current ripples used to determine the movement of the rotor.

According to an alternative embodiment, the final signal value is unequal zero, wherein the braking curve causes a discontinuous drop of the drive signal from the final signal value to zero. This allows for a short fall time. The final signal value may be adapted to prevent a crossing of a ripple generating position after final reduction of the drive signal to zero. For example, the final signal value may be adapted to not exceed an experimentally determined maximum final signal value, above which such a crossing takes place. The maximum final signal value may depend on the negative slope of the drive signal during its linear decrease between the initial signal value and the final signal value.

According to an embodiment, the drive signal is controlled according to the braking curve using open loop control, especially open loop control of a pulse width modulated control signal generating the drive signal. In this case, the braking curve may specify the duty cycle of the pulse width modulated drive signal. During the fall time, the duty cycle may, for example, be linearly reduced from an initial duty cycle value to a final duty cycle value. The final duty cycle value may, for example, be zero or it may be non-zero. When implementing a nonzero final duty cycle value, the duty cycle may abruptly drop to zero after having reached the final duty cycle value.

According to an alternative embodiment, the drive signal is regulated according to the braking curve using closed loop control, especially closed loop current control, with the sensed coil current as feedback signal. In this case, the braking curve may specify a desired current curve according to which the sensed coil current is regulated.

According to an embodiment, the method comprises: measuring a measured initial coil current prior to braking the motor, adapting a predetermined current curve, especially an amplitude of the predetermined current curve, so that an initial value of the predetermined current curve matches the measured initial coil current, using the adapted predetermined current curve as the braking curve specifying the fall time.

By measuring the initial coil current prior to braking the motor and by adapting the predetermined current curve accordingly, it is possible to adapt the braking curve to different load conditions of the motor. In automotive applications, the load experience by the electric motor may depend on the amount of friction that is present when the electric motor is moving an electrically actuated device, such as a power window, sunroof, tail gate or the like. The friction may be depend on the position of the device. For e. g. a power window, the friction depends on the size of the part of the window that is in contact with a rubber gasket surrounding the window in its closed position, so that the friction increases during final closing of the window.

According to an embodiment, the fall time of the braking curve matches a predefined fall time for all initial signal values. This allows for easy adaption of the braking curve to different initial signal values, especially when the braking curve is obtained from a predetermined braking curve that is stored in a memory unit of a control system performing the method. The braking curve may then be adapted to different initial signal values by scaling the amplitude of the braking curve to match the initial signal value.

According to an alternative embodiment, a slope of the braking curve matches a predefined deceleration for all initial signal values. This ensures that the additional current, which is induced by braking the motor, is constant for all initial signal values and does not increase for higher initial signal values. Consequently, it is possible to reliably detect all current ripples irrespective of the amount of drive current drawn by the motor when initiating the reduction of the drive current.

According to an embodiment, the method comprises: receiving a braking command for initiating the braking of the motor, determining a phase of the electric motor, checking whether the phase of the electric motor reaches a predetermined phase after having received the braking command, and starting the reduction of the drive signal when the phase of the electric motor reaches the predetermined phase.

In other words, after receiving the braking command, the braking of the motor is delayed until the electric motor reaches the predetermined phase and braking always starts at the predetermined phase. The predetermined phase may be chosen in a way that a crossing of a ripple generating position by the rotor is avoided after the drive signal has been reduced to zero according to the braking curve.

According to an embodiment, the electric motor is a commutated electric motor, especially a commutated brushed direct current motor, wherein the ripple generating position is a commutation position of the electric motor. The number of ripple generating positions then corresponds to the number of phases of the electric motor.

According to an embodiment, the drive coil is an armature of the electric motor and the coil current is an armature current of the electric motor. The armature may be positioned at the rotor or at a stator of the electric motor.

In another aspect, the present disclosure is directed at a control system for an electric motor comprising a supply module adapted to supply a drive signal to a drive coil of the electric motor, a sensing module adapted to sense a coil current of the drive coil, a detection module adapted to detect current ripples of the sensed coil current caused by the rotor of the electric motor crossing ripple generating positions and to infer the movement of the rotor from the detected ripples, and a control module adapted to brake the motor by controlling the supply module to reduce the drive signal supplied to the drive coil from an initial signal value to zero according to a braking curve specifying a non-zero fall time during which the drive signal is reduced from the initial value to zero. Thereby, the braking curve is adapted so that the rotor does not cross a ripple generating position after the drive signal has been reduced to zero.

The control system may be configured to carry out the method of the present disclosure. Insofar, all technical effect and embodiments described in connection with the method also apply mutatis mutandis to the control system.

The supply module may comprise a transistor circuit for generating a pulse width modulated drive signal and the control module may be configured to generate a pulse width modulated control signal that is controlling the transistor circuit. The sensing module may be electrically connected to the drive coil for sensing the coil current. For example, the sensing module may comprise a shunt resistor through which the coil current flows and the sensing module may be configured to measure a voltage drop across the shunt resistor to determine the coil current. Instead of a shunt resistor, the sensing module may comprise any other sensing means, for example a flux gate or the like. The control module may comprise a memory unit in which the braking curve or the predetermined current curve is stored. The control module may be configured to adapt the braking curve of the predetermined current curve to the initial signal value at the beginning of the reduction of the drive signal.

In another aspect, the present disclosure is directed at a vehicle having an electric actuating drive for a window, sunroof, passenger seat, tail gate or the like, the electric actuating drive comprising an electric motor and a control system for the electric motor according to the present disclosure. All technical effects and embodiments of the control system and the electric motor that are described in connection with the method and the control system of the present disclosure also apply mutatis mutandis to the actuating drive of the vehicle. For example, the electric motor may be configured as it is described in connection with the method and the control system of the present disclosure. The electric motor may, for example, be a commutated brushed direct current motor, and the ripple generating positions may be commutation positions of the electric motor.

DRAWINGS

Figure 2:
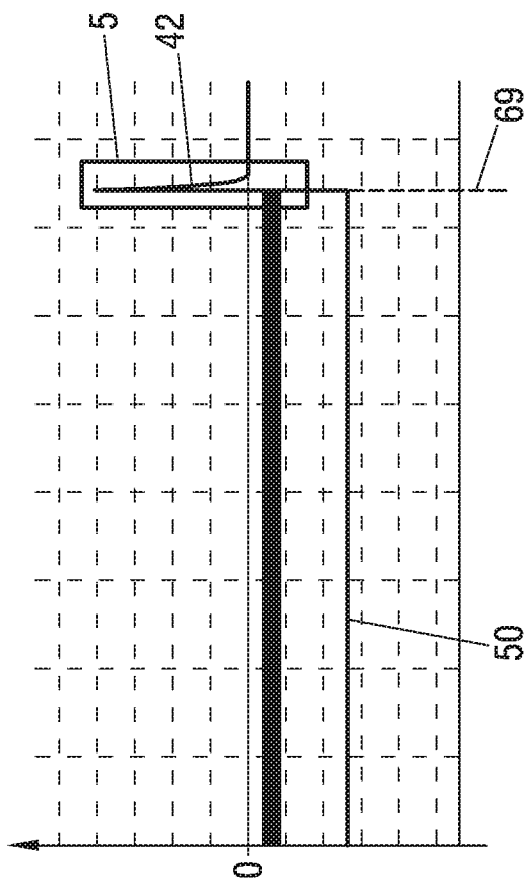
Figure 3:
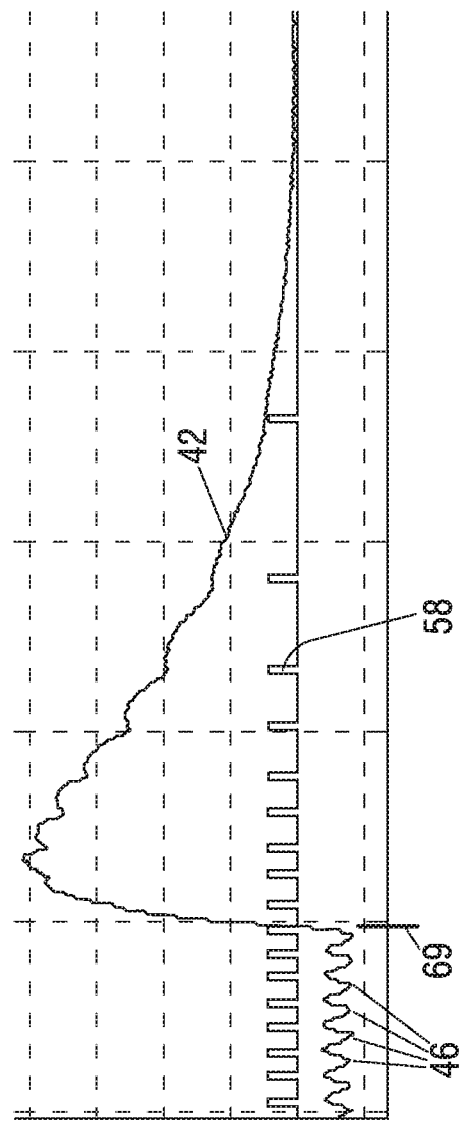
Figure 4:
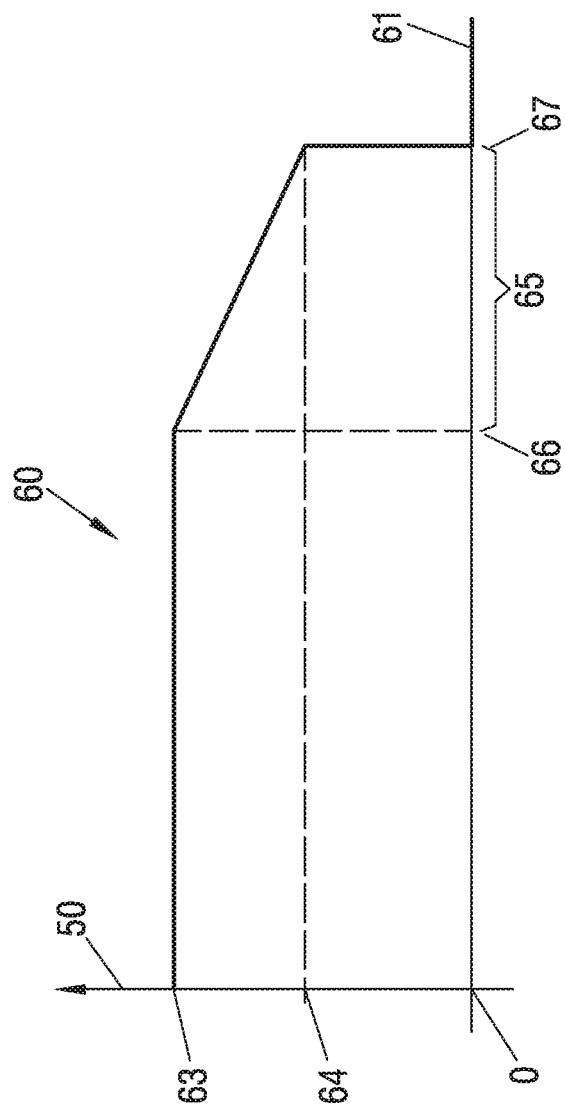
Figure 5:
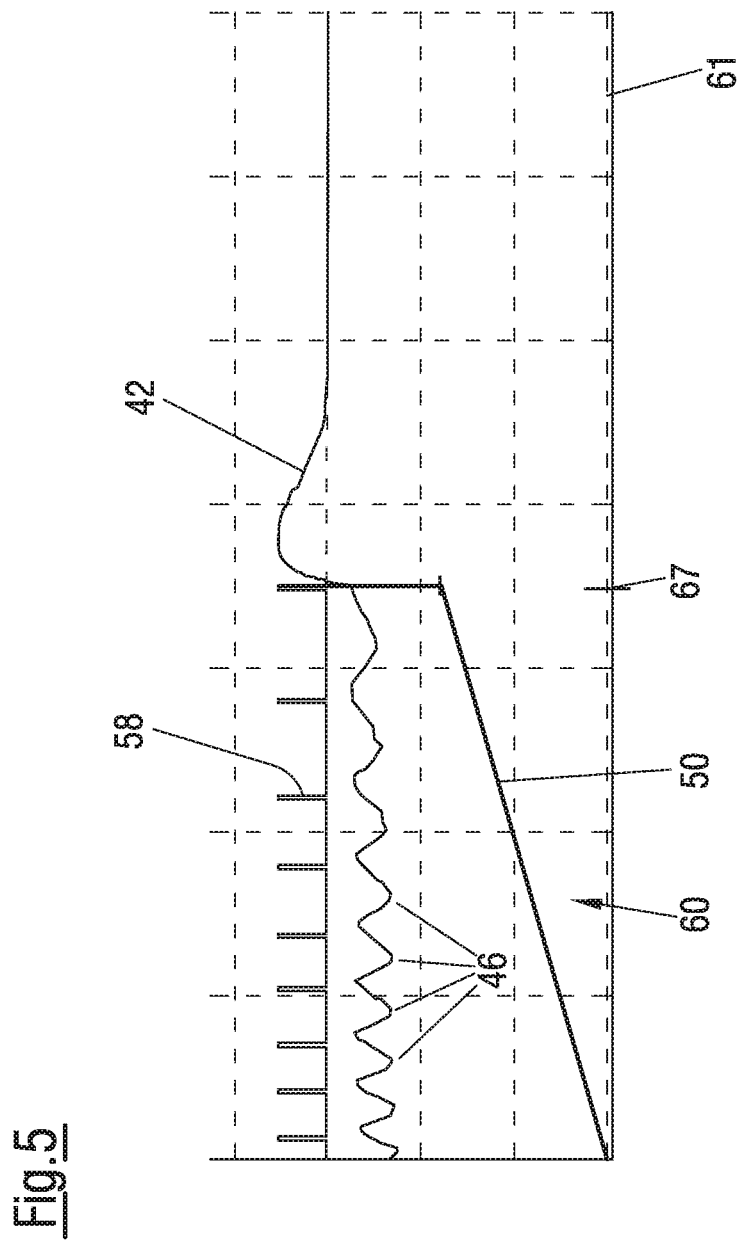
Figure 6:
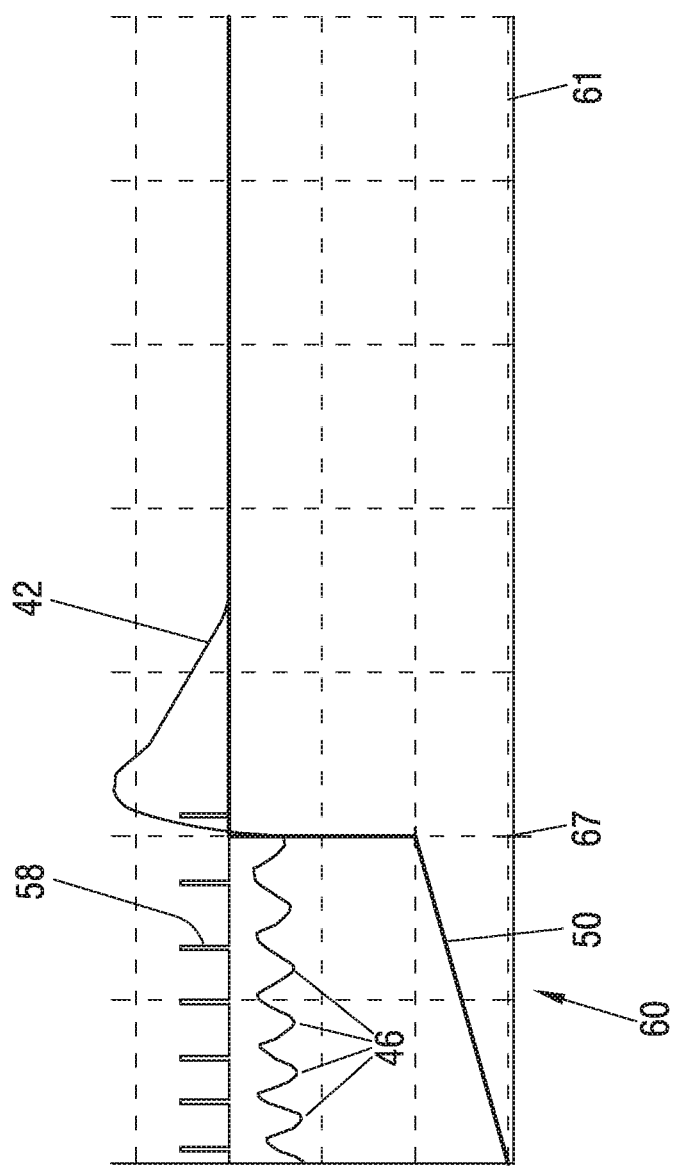
Figure 7:
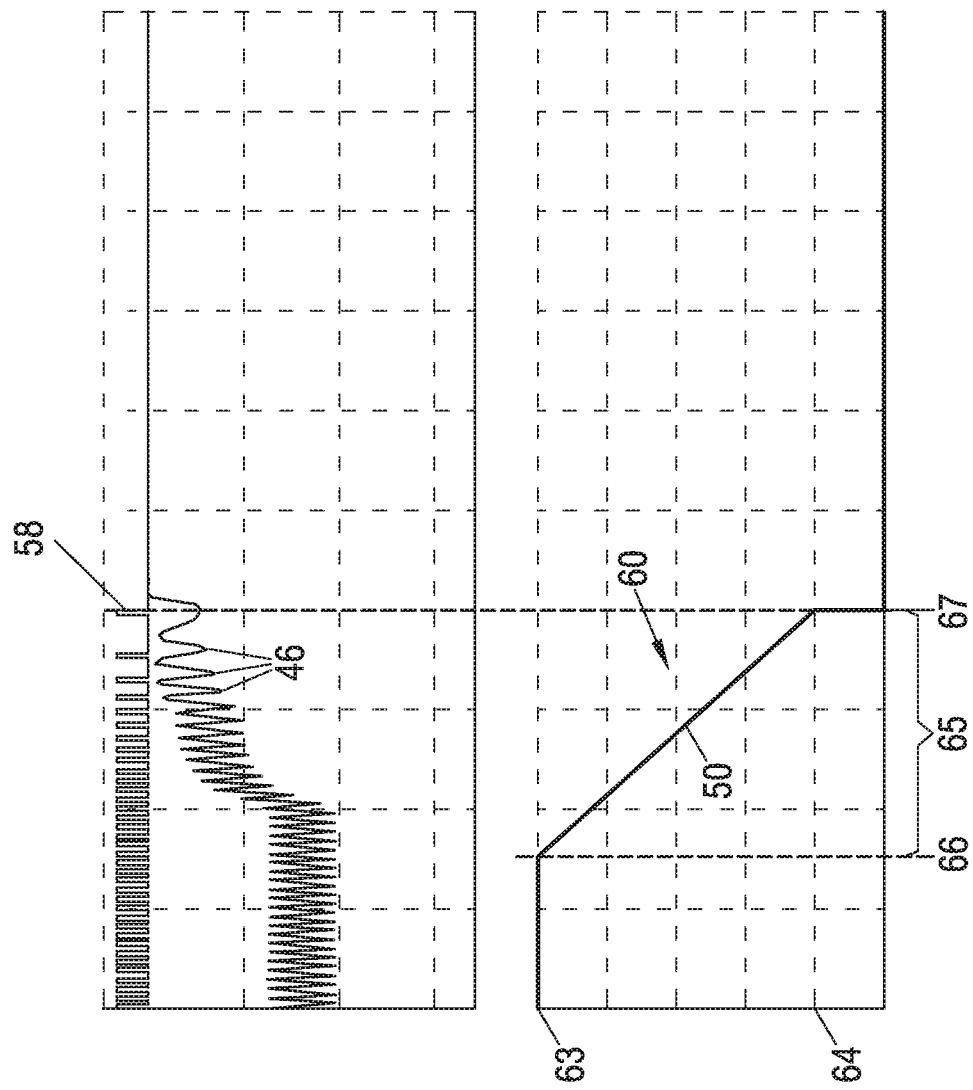
Figure 8:
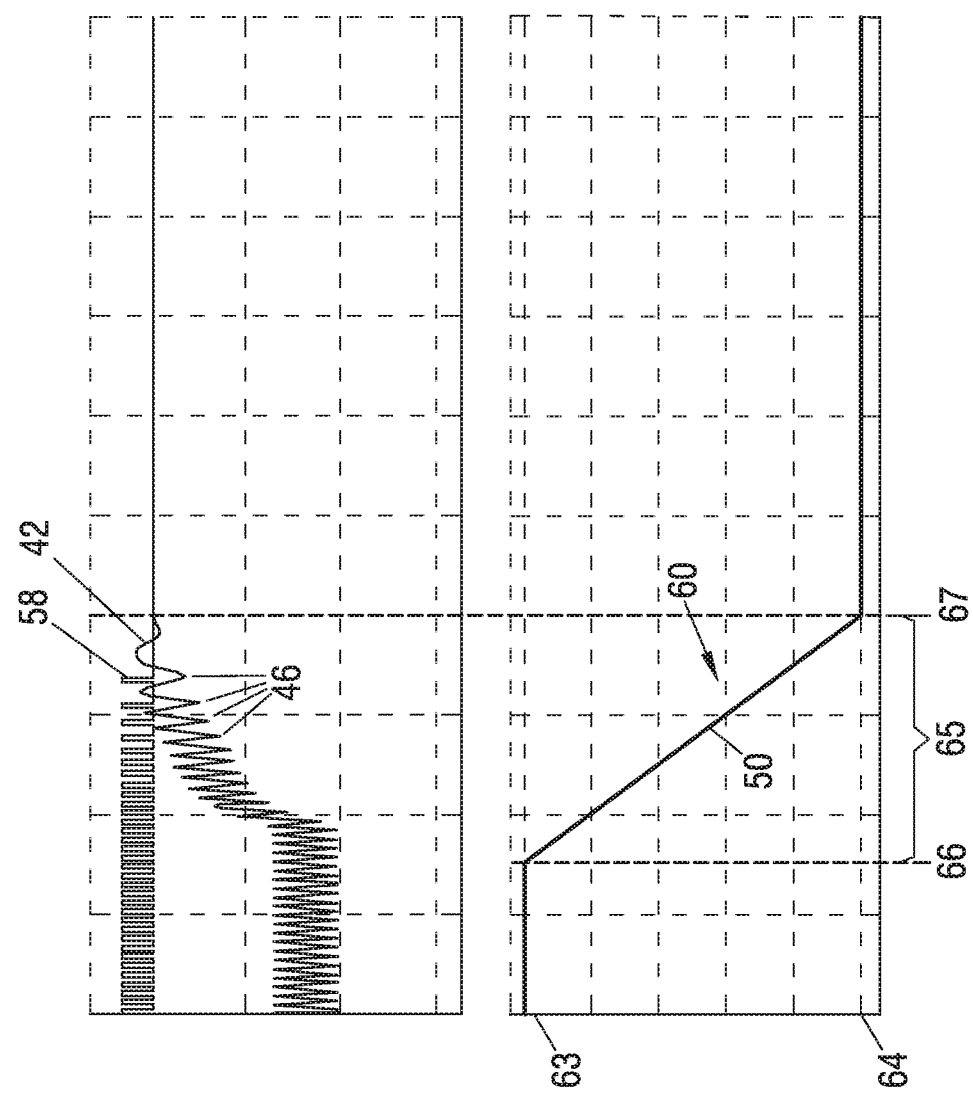
Figure 9:
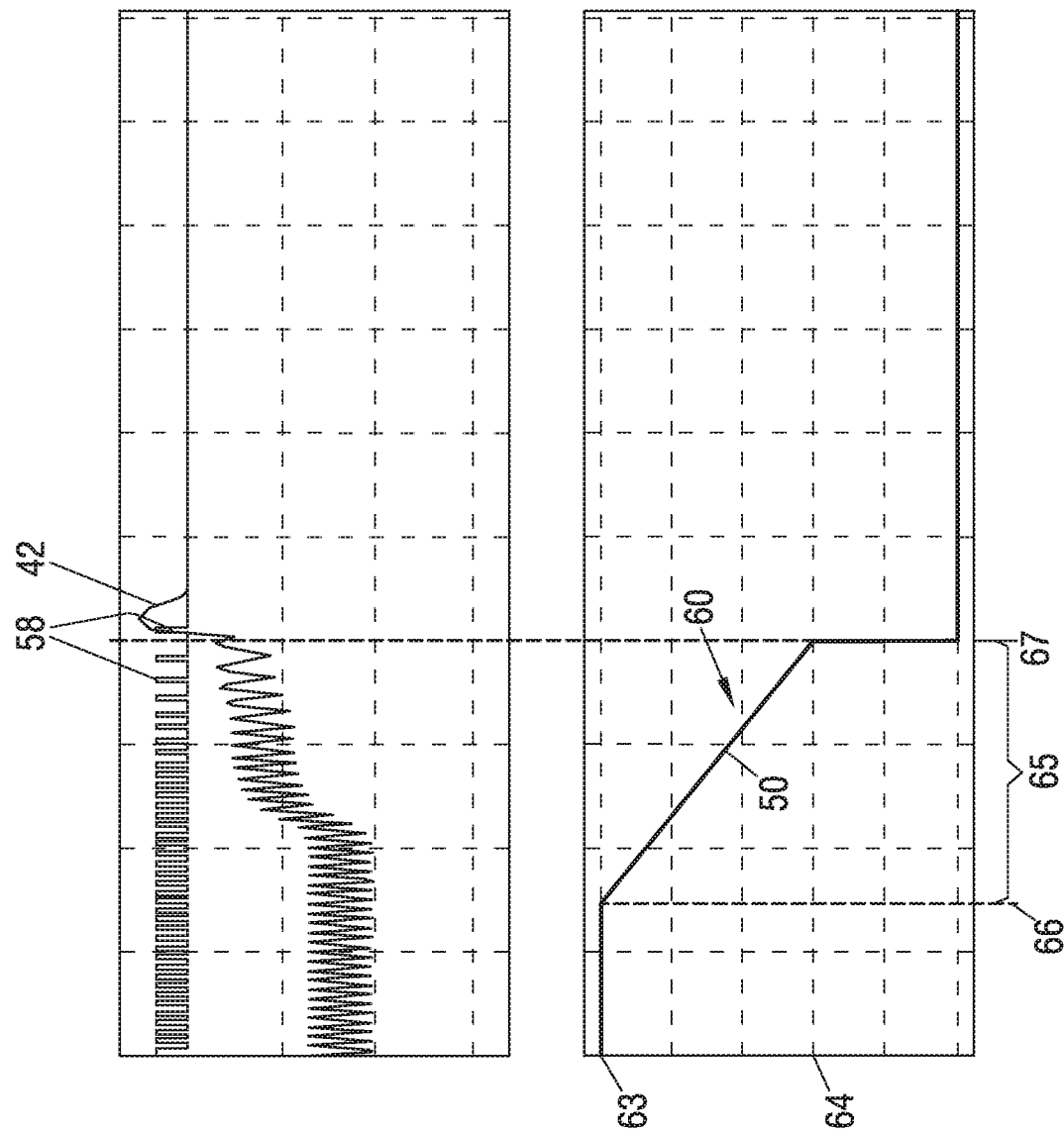
Figure 10:
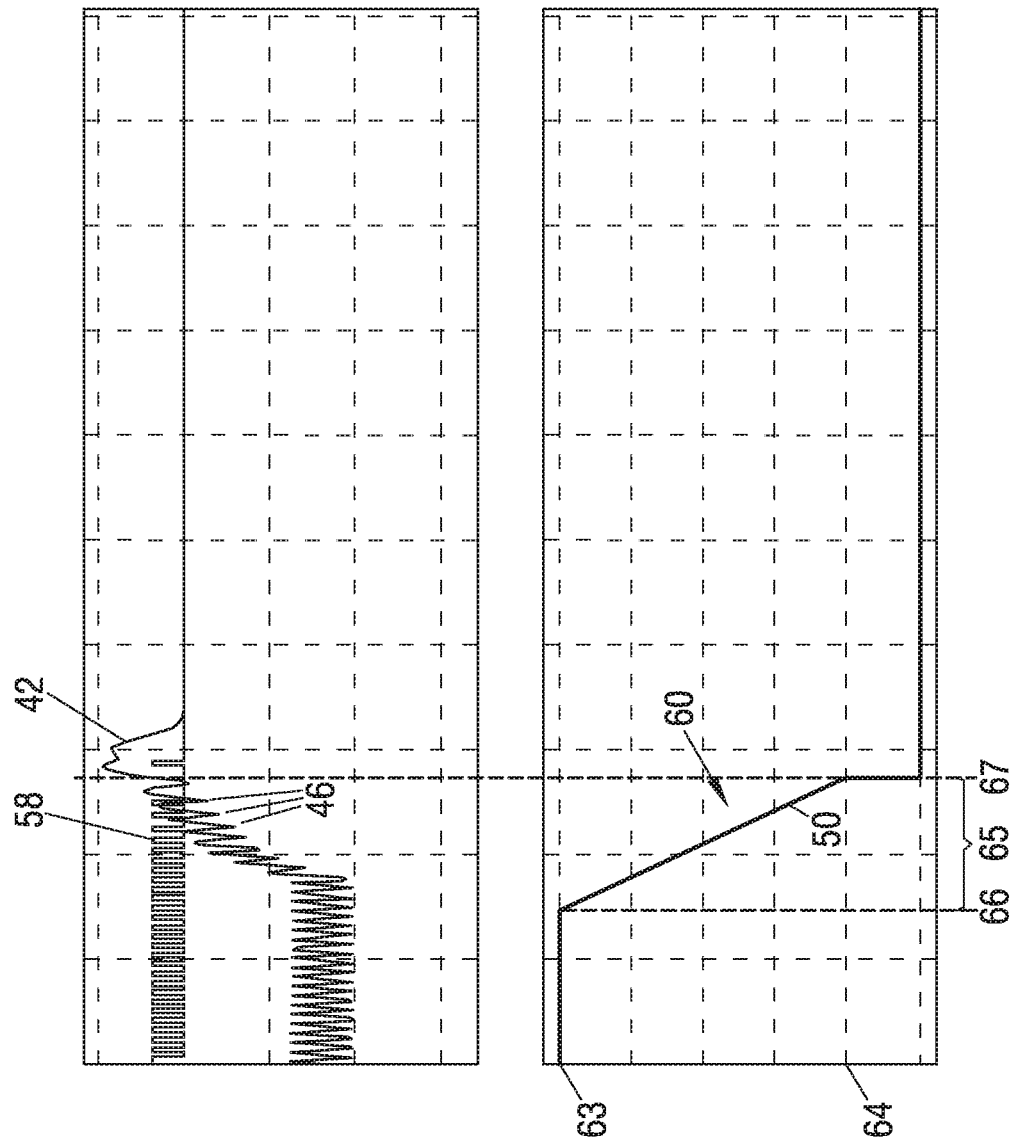
Figure 11:
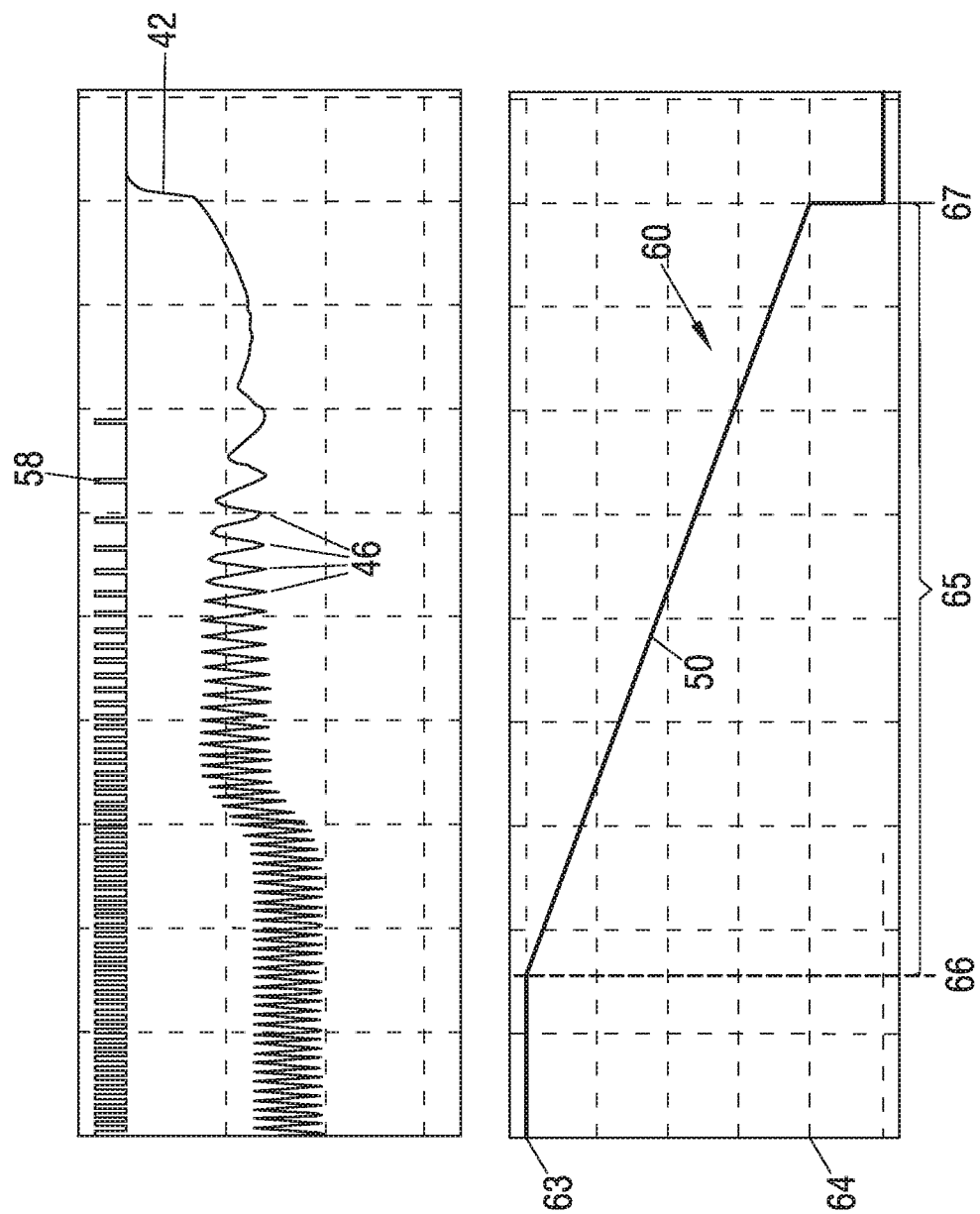
Figure 12:
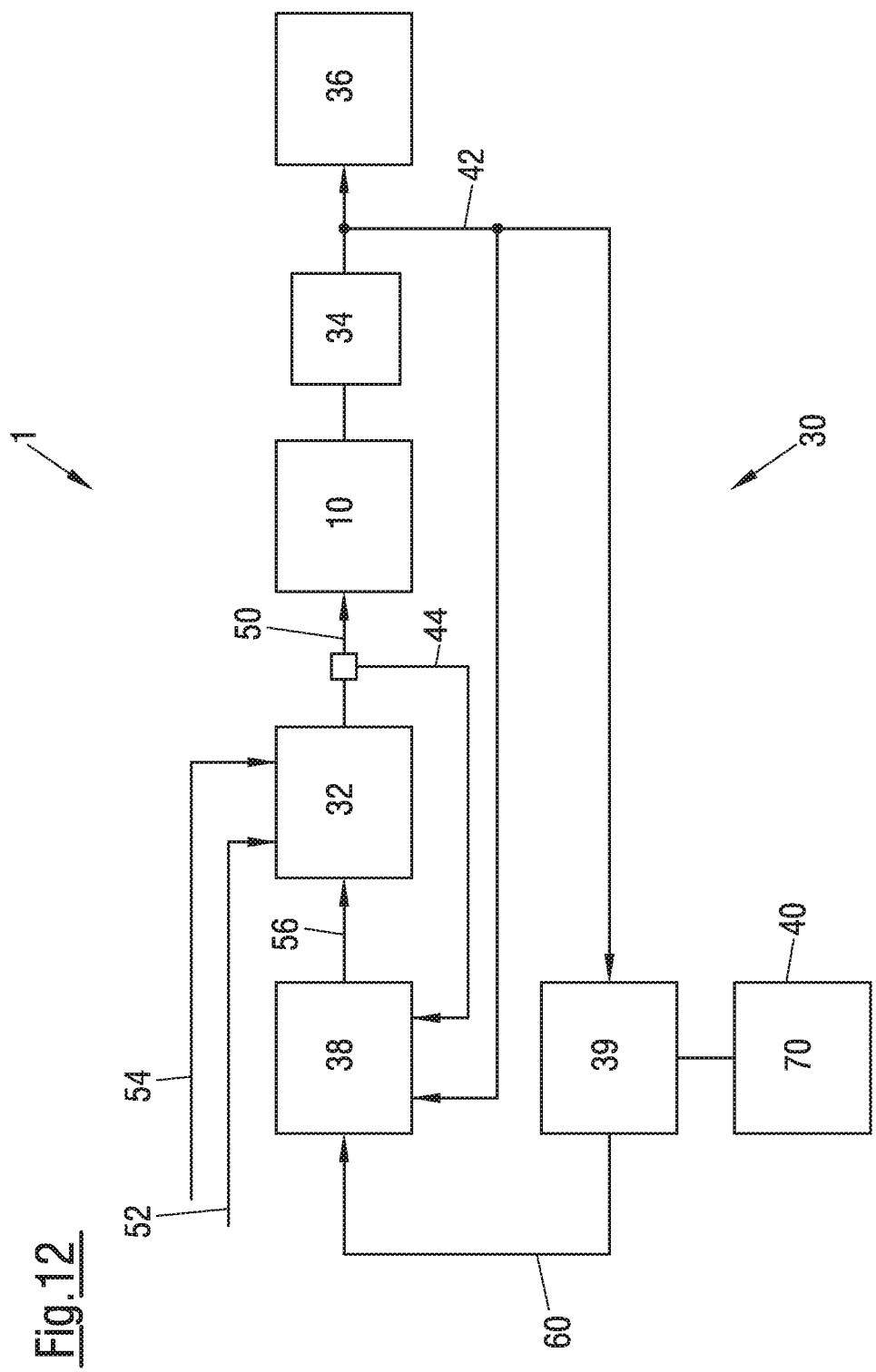
Figure 13:
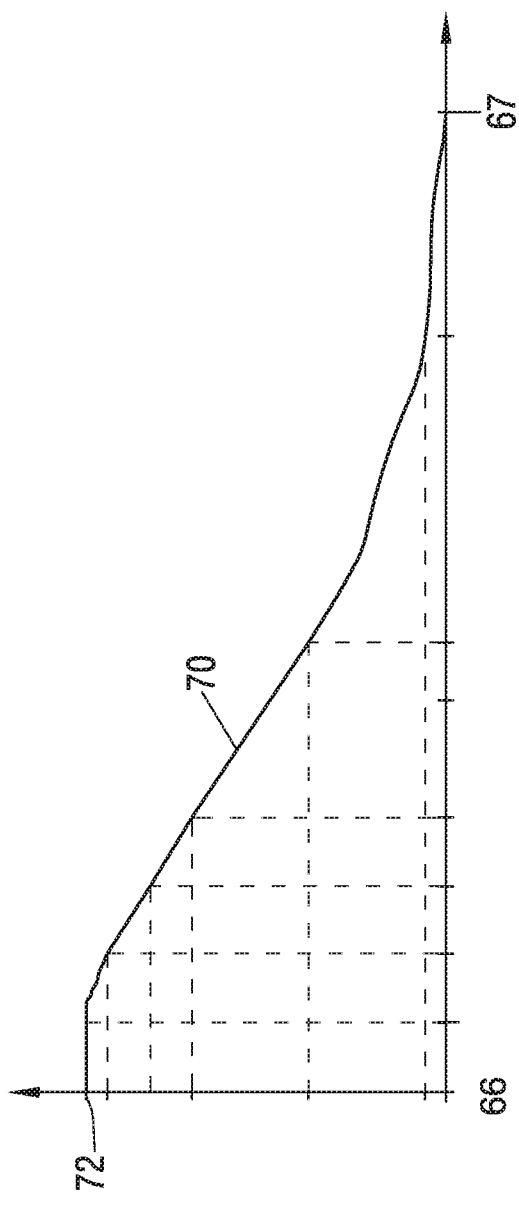
Figure 14:
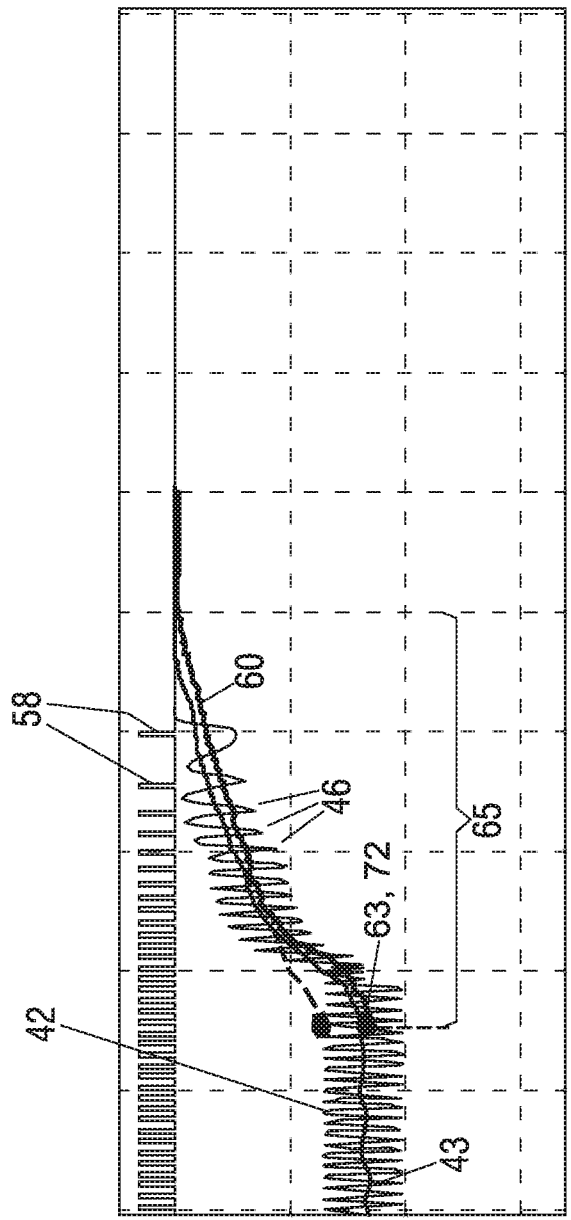
Figure 15:
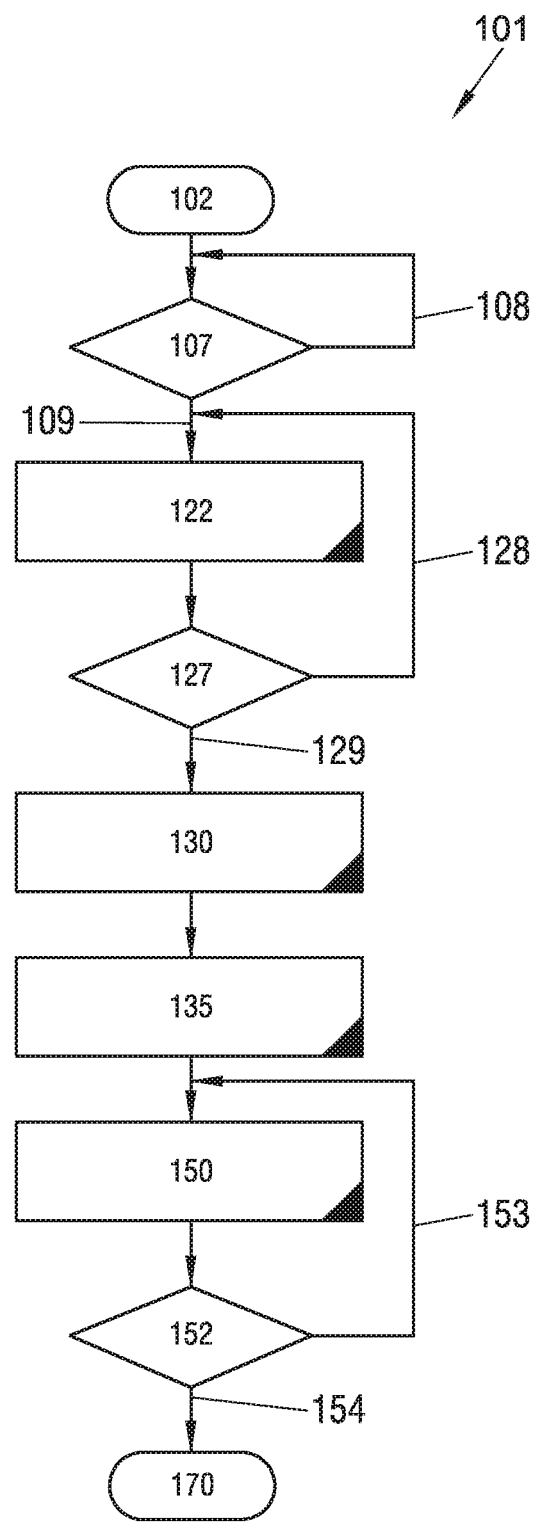
Figure 16:
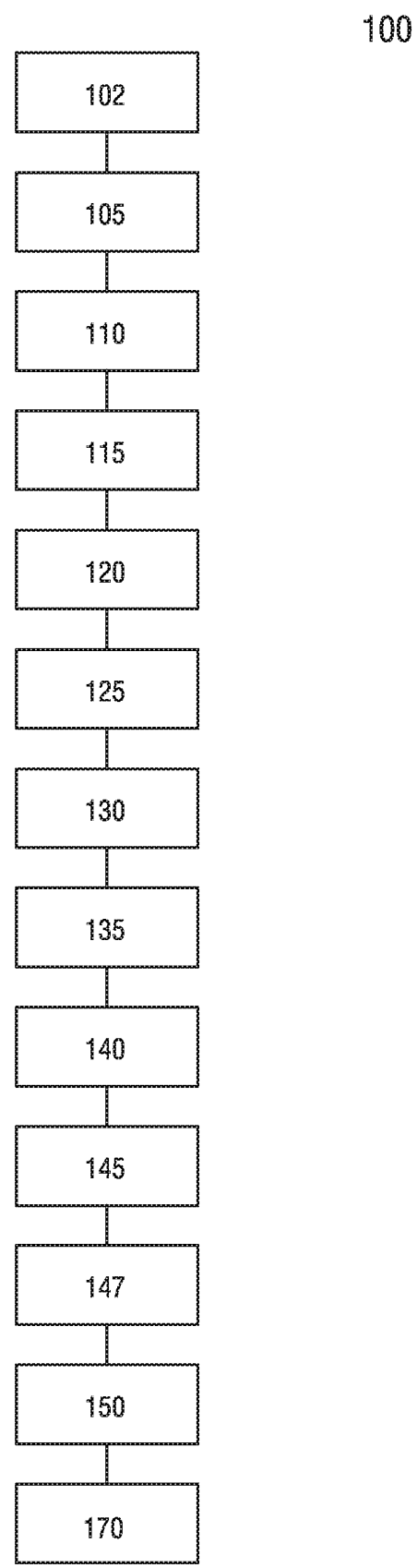

Exemplary embodiments and functions of the present disclosure are described below in conjunction with the following drawings, showing schematically:

FIG. 1—a first embodiment of an electric actuating drive;

FIG. 2—a time dependence of a coil current of an electric motor when abruptly switching off a drive signal according to the prior art;

FIG. 3—an enlarged view of a part of the time dependent coil current shown in FIG. 2;

FIG. 4—a braking curve according to the present disclosure;

FIG. 5—a time dependence of a coil current during reduction of a drive signal according to a braking curve;

FIG. 6—a time dependence of the coil current for a braking curve with non-optimum fall time and slope;

FIG. 7—a time dependence of the coil current for a braking curve with properly adapted fall time and slope;

FIG. 8—a time dependence of the coil current for a further braking curve with non-optimum fall time and slope;

FIG. 9—a time dependence of the coil current for a further braking curve with non-optimum fall time and slope;

FIG. 10—a time dependence of the coil current for a further braking curve with non-optimum fall time and slope;

FIG. 11—a time dependence of the coil current for a further braking curve with non-optimum fall time and slope;

FIG. 12—a second embodiment of an electric actuating drive;

FIG. 13—a predetermined current curve for generating a braking curve for closed loop control;

FIG. 14—a closed loop reduction of a drive signal according to a braking curve;

FIG. 15—a method carried out by a control module for closed loop control; and FIG. 16—a method for determining a movement of a rotor of an electric motor.

DETAILED DESCRIPTION

FIG. 1 depicts a first embodiment of an electric actuating drive 1 comprising an electric motor 10 and a control system 30. The electric motor 10 is configured as a commutated brushless direct current motor. The control system 30 comprises a supply module 32 that is connected to a drive coil of the electric motor 10 and supplies a drive signal 50 to the drive coil. The control system 30 further comprises a sensing module 34 that is also connected to the drive coil of the electric motor 10 and is configured to sense a coil current 42 flowing through the drive coil. A detection module 36 of the control system 30 is connected to the sensing module 34 and detects current ripples of the sensed coil current 42 that are generated when a rotor of the electric motor 10 crosses ripple generating positions. The detection module 36 is furthermore configured to infer the movement of the rotor of the electric motor 10 from the detected ripples.

The control system 30 further comprises a control module 38 that is connected to the supply module 32 and provides a pulse width modulated (PWM) control signal 56 to the supply module 32. Based on the control signal 56, the supply module 32 generates the drive signal 50 as a pulse width modulated signal from a supply voltage 52. The control module 38 is configured for open loop control of the drive signal 50. When switching off or braking the motor 10, the control module 38 reduces the drive signal 50 according to a braking curve 60 stored in a memory unit 40 of the control system 30. The braking curve 60 constitutes a desired braking curve 60, which is used as a reference signal for braking the motor 10.

FIG. 2 depicts a time dependence of the sensed coil current 42 when abruptly reducing the drive signal 50 at a switching time 69 without employing the braking curve 60. In this case, the coil current 42 exhibits a large current spike when the electric motor 10 runs down to zero velocity after switching off the drive signal 50. Additionally, as the electric motor 10 functions as a generator when running down without the drive signal 50 applied, the coil current 42 reverses direction during rundown of the motor 10.

FIG. 3 depicts an enlarged view of the region of FIG. 2 that is bounded by the box 5. The sensed coil current 42 exhibits current ripples 46 that have a high signal to noise ratio and are thus reliably detectable as long as the drive signal 50 is applied to the drive coil. The current ripples 46 are generated at crossing events 58, at which the rotor of the electric motor 10 crosses the ripple generating positions. As can be seen from the crossing events 58 depicted in FIG. 3, the electric motor 10 crosses nine times a ripple generating position after the drive signal 50 has been switched of at the switching time 69. However, the current ripples 46 that are associated with these nine crossing events 58 are superimposed by the large current spike induced by switching off the drive signal 50, so that these current ripples 46 may not be reliably detected. This leads to errors when deriving the movement of the rotor and a rotor position by counting the detected current ripples 46.

The current spike depicted in FIGS. 2 and 3 may be avoided by ramping down the drive signal 50 according to the braking curve 60 when switching off or braking the motor 10. Thereby, the control module 38 reduces the drive signal 50 over time 61 according to the braking curve 60 as depicted in FIG. 4. As can be seen, the control module 38 changes the duty cycle of the pulse width modulated control signal 56 according to the braking curve 60 so that the drive signal 50 changes linearly during a fall time 65 from an initial signal value 63 at a beginning 66 of the reduction of the drive signal 50 to a final signal value 64 at an end 67 of the reduction of the drive signal 50. When reaching the final signal value 64 at the end 67 of the fall time 65, the drive signal abruptly drops to zero. Apart from the duration of the fall time 65, the braking curve 60 is characterized by a slope with which the drive signal 50 is linearly reduced during the fall time 65. This slope is given by the difference between the initial signal value 63 and the final signal value 64 divided by the fall time 65.

FIG. 5 depicts the effect of reducing the drive current 50 according to the braking curve 60 depicted in FIG. 4. The coil current 42 gradually reduces to zero and the current ripples 46 remain clearly visible and detectable during the reduction of the drive current 50. As can be inferred from the crossing events 58 depicted in FIG. 5, the fall time 65 and the slope of the braking curve 60 are chosen in a way that the rotor of the electric motor 10 does not cross a ripple generating position after switching off the drive signal 50 at the end 67 of the reduction of the drive signal 50. Consequently, there is no ripple 46 that may be obscured by the residual current spike that is generated after switching off the drive signal 50.

FIG. 6 depicts a time dependence of the coil current 42 for a braking curve 60 with non-optimum fall time 65 and slope. This braking curve 60 exhibits the same slope as the braking curve shown in FIG. 5 but has a shorter fall time 65. This causes a too early switch-off of the drive signal 50, which results in the rotor crossing an additional ripple generating position after the end 67 of the reduction of the drive signal 50. Consequently, the corresponding ripple 46 is obscured by the current spike generated during rundown of the motor 10 and may be missed during detection.

FIG. 7 depicts a time dependence of the coil current 42 for a further braking curve 60 with properly adapted fall time 65 and slope. Again, the rotor does not cross a ripple generating position after the end 67 of the reduction of the drive signal 50 to zero. Additionally, the coil current 42 does not reverse before the drive signal 50 has reached zero at the end 67 of the reduction of the drive signal 50. Consequently, all ripples exhibit a high signal to noise ratio so that they are reliably detectable.

FIG. 8 depicts a time dependence of the coil current 42 for a further braking curve 60 with non-optimum fall time 65 and slope. Compared to the braking curve 60 shown in FIG. 7, the further braking curve 60 depicted in FIG. 8 exhibits the same fall time 65 but a steeper slope and the drive signal 50 is linearly ramped down to zero. The steeper slope of the braking curve 60 depicted in FIG. 8 results in the coil current 42 changing sign before the drive signal 50 has reached zero at the end 67 of the reduction of the drive signal 50. This leads to an additional, spurious ripple of the coil current 42 that triggers the detection module 36 and thus falsifies the position of the rotor derived from the current ripples 46.

FIG. 9 depicts a time dependence of the coil current 42 for a further braking curve 60 with non-optimum fall time 65 and slope. Compared to the braking curve 60 shown in FIG. 7, the further braking curve 60 depicted in FIG. 9 exhibits the same fall time 65 but a shallower slope. This results in a larger final signal value 64 and consequently in a larger current spike of the coil current 42 when switching from the larger final signal value 64 to zero. As a result, the rotor of the electric motor 10 crosses a ripple generating position after the end 67 of the reduction of the drive signal 50 and the corresponding ripple is obscured by the current spike generated in the drive coil.

FIG. 10 depicts a time dependence of the coil current 42 for a further braking curve 60 with non-optimum fall time 65 and slope. Compared to the braking curve 60 shown in FIG. 7, the further braking curve 60 depicted in FIG. 10 exhibits both a shorter fall time 65 and a steeper slope, while its final signal value 64 corresponds to the final signal value 64 of the braking curve 60 shown in FIG. 7. As a result, the coil current 42 reverses prior to switching off the drive signal 50 at the end 67 of the reduction of the drive signal 50. Additionally, the rotor crosses a ripple generating position after switch off of the drive signal 50.

FIG. 11 depicts a time dependence of the coil current 42 for a further braking curve 60 with non-optimum fall time 65 and slope. Compared to the braking curve 60 shown in FIG. 7, the further braking curve 60 depicted in FIG. 11 has both a shallower slope and a longer fall time 65, while its final signal value 64 corresponds to the final signal value 64 of the braking curve 60 shown in FIG. 7. Although the rotor does not cross a ripple generating position after switching off the drive signal 50 and the coil current 42 does not reverse, it can be inferred from a comparison of the braking curves 60 shown in FIGS. 7 and 11 that the braking curve 60 of FIG. 11 results in a fall time 65 that is longer than necessary to ensure reliable detection of all current ripples 46 caused by the rotor of the electric motor 10.

FIG. 12 depicts a second embodiment of an electric actuating drive 1 used to implement closed-loop control of a drive signal 50 supplied to an electric motor 10. The electric actuating drive 1 according to the second embodiment comprises a supply module 32 supplying the drive signal 50 to a drive coil of an electric motor 10, a sensing module 34 sensing a coil current 42 of the motor 10 and a detection module 36. The supply module 32 receives a supply voltage 52 and a control command 54 controlling the direction of movement of the electric motor 10.

The electric actuating drive 1 shown in FIG. 12 comprises a second embodiment of a control module 38 described herein. According to the second embodiment, the control module is configured for closed-loop control of the drive signal 50 by delivering a control signal 56 to the supply module 32 to control the drive signal 50 generated by the supply module 32. For closed-loop control, a coil voltage 44 representing a voltage applied to the drive coil of the electric motor 10 and the coil current 42 sensed by the sensing module 34 are fed back to the control module 38. The control module 38 controls the drive signal 50 in a way that the sensed coil current 42 follows a braking curve 60 that is supplied to the control module 38 by a braking control module 39.

The braking control module 39 is configured to adapt a predetermined current curve 70 that is stored in a memory unit 40 of the control system 30 so that an initial value of the predetermined current curve 70 matches a measured initial coil current 42 at the beginning of the braking of the motor 10. The measured initial coil current 42 is measured prior to braking the motor 10. For example, the measured initial coil current 42 may represent an average coil current 42 flowing through the drive coil at the beginning of the reduction of the drive signal 50 during braking.

FIG. 13 depicts the predetermined current curve 70 used to generate the braking curve 60 according to which the control module 38 reduces the drive signal 50 to zero. The predetermined current curve 70 continuously decreases from the initial value 72 at the beginning 66 of the reduction of the drive signal 50 to zero at the end 67 of the reduction of the drive signal 50. The predetermined current curve 70 may be specified analytically by a mathematical formula that is stored in the memory unit 40 and that is evaluated by the braking control module 39. Alternatively, samples of the predetermined current curve 70 may be stored in the memory unit 40. The samples may be spaced by a fixed sampling interval. The sampling interval may correspond to a sampling interval of a detection algorithm employed by the detection module 36 to detect the current ripples used to infer the movement of the rotor of the electric motor 10. This minimizes the influence of a discrete reduction of the drive signal 50 on the detection of the current ripples.

FIG. 14 depicts the effect of the reduction of the drive signal 50 according to the braking curve 60 via closed loop control using the control system 30 according to the second embodiment. As can be seen, the average value 43 of the coil current 42 closely follows the braking curve 60 derived from the predetermined current curve 70. The braking curve 60 has been generated by adapting an amplitude of the predetermined current curve 70 so that the initial value 72 of the predetermined current curve 70 matches the average value 43 of the sensed coil current 42 at the beginning of the reduction of the drive signal 50.

FIG. 15 depicts a method 101 carried out by the control module 38 and the braking control module 39 to reduce the drive signal 50 according to the braking curve 60. After starting (102), the method comprises checking 107 whether the motor 10 is running. As long as the motor 10 is not running (108), checking 107 is repeated. If the motor 10 is running (109), the average value 43 of the coil current 42 is determined (122) and it is checked (127) whether the motor 10 is braking. A braking of the motor 10 may be inferred from a braking command being received by the control module 38, for example from a stop button or a master control unit, or it may be inferred from a reduction of the average value 43 of the coil current 42. As long as the motor is not braking (128), the determination 127 of the average value 43 and the checking 127 whether the motor is braking is repeated.

If the motor breaks (129), the measured initial coil current 42 is determined (130) by reading the actual average value 43 of the coil current 42 determined in step 122 as the measured initial coil current 42 for adapting the predetermined current curve 70. Subsequently, the method 101 comprises adapting 135 the amplitude of the predetermined current curve 70 so that its initial value 72 corresponds to the average value 43 of the measured initial coil current 42. The drive signal 50 is then reduced (150) according to the braking curve 60 given by the adapted predetermined current curve 70. After the reduction 150 of the drive signal 50, it is checked (152) whether the motor 10 stands. As long as the motor 10 is not standing (153), the reduction 150 of the drive signal 50 is repeated. When the motor 10 stands (154), the method ends (170).

Generally, the electric actuating drives 1 perform a method 100 for determining a movement of the rotor of the electric motor 10 depicted in FIG. 16. After starting (102), the method 100 comprises supplying 105 the drive signal 52 to the drive coil of the electric motor 10. The method 100 further comprises sensing 110 the coil current 42, detecting 115 current ripples of the coil current 42 and inferring 120 the movement of the rotor of the electric motor 10 from the current ripples. The method 100 may further comprise inferring a rotor position from the current ripples. After receiving 125 a braking command, the method 100 comprises measuring 130 the measured initial coil current 42 and adapting the amplitude of the predetermined braking curve 70 so that the initial value 72 of the predetermined current curve 70 matches the measured initial coil current 42. The adapted predetermined braking curve 70 is then used (140) as the braking curve 60 according to which the drive signal 50 will be reduced.

The method 100 further comprises determining 145 a phase of the electric motor 10 after receiving 125 the braking command. It is then checked (147) whether the phase of the electric motor 10 reaches a predetermined phase and the drive signal 50 is reduced (150) according to the braking curve 60 as soon as the electric motor 10 reaches the predetermined phase. When the drive signal 50 has been reduced to zero, the method ends (170).

We claim:

1. A method for determining a movement of a rotor of an electric motor, the method comprising:
    supplying a drive signal to a drive coil of the electric motor,
    sensing a coil current of the drive coil,
    detecting current ripples of the sensed coil current caused by the rotor of the electric motor crossing ripple generating positions,
    inferring the movement of the rotor from the detected ripples, and
    braking the motor by reducing the drive signal supplied to the drive coil from an initial signal value to zero according to a braking curve specifying a non-zero fall time during which the drive signal is reduced from the initial signal value to zero,
    wherein the drive signal is regulated according to the braking curve using closed loop current control with the sensed coil current as a feedback signal, and
    wherein the braking curve is adapted so that the rotor does not cross a ripple generating position after the drive signal has been reduced to zero.

2. The method according to claim 1, wherein the braking curve is adapted so that the coil current does not reverse before the drive signal has reached zero.

3. The method according to claim 1, wherein the braking curve causes a linear decrease of the drive signal between the initial signal value and a final signal value.

4. The method according to claim 3, wherein the final signal value is zero.

5. The method according to claim 3, wherein
    the final signal value is different than zero, and
    the braking curve causes a discontinuous drop of the drive signal from the final signal value to zero.

6. The method according to claim 1, wherein the drive signal is controlled according to the braking curve using open loop control of a pulse width modulated control signal generating the drive signal.

7. The method according to claim 1, comprising:
    measuring a measured initial coil current prior to braking the motor,
    adapting a predetermined current curve so that an initial value of the predetermined current curve matches the measured initial coil current, and
    using the adapted predetermined current curve as the braking curve specifying the fall time.

8. The method according to claim 1,
    wherein the fall time of the braking curve matches a predefined fall time for all initial signal values,
    or
    wherein a slope of the braking curve matches a predefined deceleration for all initial signal values.

9. The method according to claim 1, comprising:
    receiving a braking command for initiating braking of the motor,
    determining a phase of the electric motor,
    checking whether the phase of the electric motor reaches a predetermined phase after having received the braking command, and
    starting reducing the drive signal when the phase of the electric motor reaches the predetermined phase.

10. The method according to claim 1, wherein
    the electric motor is a commutated electric motor, and
    wherein the ripple generating position is a commutation position of the electric motor.

11. The method according to claim 1, wherein
    the drive coil is an armature of the electric motor, and
    the coil current is an armature current of the electric motor.

12. A control system for an electric motor, the control system comprising
    a supply module configured to supply a drive signal to a drive coil of the electric motor,
    a sensing module configured to sense a coil current of the drive coil,
    a detection module configured to detect current ripples of the sensed coil current caused by the rotor of the electric motor crossing ripple generating positions and to infer the movement of the rotor from the detected ripples, and
    a control module configured to brake the motor by controlling the supply module to reduce the drive signal supplied to the drive coil from an initial signal value to zero according to a braking curve specifying a non-zero fall time during which the drive signal is reduced from the initial signal value to zero, wherein the drive signal is regulated according to the braking curve using closed loop current control with the sensed coil current as a feedback signal, and wherein the braking curve is adapted so that the rotor does not cross a ripple generating position after the drive signal has been reduced to zero.

13. A vehicle having an electric actuating drive for a vehicle component selected from the group of vehicle components including a window, a sunroof, a seat, and a tail gate, the electric actuating drive comprising an electric motor and the control system according to claim 12.

14. A method for determining a movement of a rotor of an electric motor, the method comprising:

supplying a drive signal to a drive coil of the electric motor, sensing a coil current of the drive coil, detecting current ripples of the sensed coil current caused by the rotor of the electric motor crossing ripple generating positions, inferring the movement of the rotor from the detected ripples, and braking the motor by reducing the drive signal supplied to the drive coil from an initial signal value to zero according to a braking curve specifying a non-zero fall time during which the drive signal is reduced from the initial signal value to zero, wherein the braking curve is adapted so that the rotor does not cross a ripple generating position after the drive signal has been reduced to zero, and wherein the fall time of the braking curve matches a predefined fall time for all initial signal values or a slope of the braking curve matches a predefined deceleration for all initial signal values.

* * * * *